(12) United States Patent
Ricciulli

(10) Patent No.: US 12,050,982 B1
(45) Date of Patent: Jul. 30, 2024

(54) DELAY SPIKING NEURAL NETWORKS

(71) Applicant: REFLEX ARC, LLC, Omaha, NE (US)

(72) Inventor: Livio Ricciulli, San Diego, CA (US)

(73) Assignee: REFLEX ARC, LLC, Omaha, NE (US)

( * ) Notice: Subject to any disclaimer, the term of this patent is extended or adjusted under 35 U.S.C. 154(b) by 671 days.

(21) Appl. No.: 17/035,345

(22) Filed: Sep. 28, 2020

Related U.S. Application Data

(60) Provisional application No. 63/044,975, filed on Jun. 26, 2020, provisional application No. 62/906,687, filed on Sep. 26, 2019.

(51) Int. Cl.
| | |
|---|---|
| *G06N 3/04* | (2023.01) |
| *G06F 18/214* | (2023.01) |
| *G06N 3/049* | (2023.01) |
| *G06N 3/063* | (2023.01) |
| *G06N 3/084* | (2023.01) |

(52) U.S. Cl.
CPC .......... *G06N 3/049* (2013.01); *G06F 18/214* (2023.01); *G06N 3/063* (2013.01); *G06N 3/084* (2013.01)

(58) Field of Classification Search
CPC ........ G06N 3/049; G06N 3/063; G06N 3/084; G06F 18/214
See application file for complete search history.

(56) References Cited

U.S. PATENT DOCUMENTS

| | | | | |
|---|---|---|---|---|
| 2013/0311415 | A1* | 11/2013 | Nishitani | G06N 3/04 706/26 |
| 2015/0046381 | A1* | 2/2015 | Malone | G06N 3/02 706/15 |
| 2019/0244079 | A1* | 8/2019 | George | G06N 3/063 |

OTHER PUBLICATIONS

Bohte et al., "Error-backpropagation in temporally encoded networks of spiking neurons", Jun. 6, 2001, Neurocomputing 48 (2002), pp. 17-37. (Year: 2001).*

* cited by examiner

*Primary Examiner* — Brent Johnston Hoover
(74) *Attorney, Agent, or Firm* — Lewis Roca Rothgerber Christie LLP

(57) ABSTRACT

A delay spiking neural network (DSNN) may include a plurality of neurons arranged in a plurality of layers, with neurons spiking based on accumulation of delayed inputs. A first to spike neuron in an output layer may provide a result of the DSNN.

4 Claims, 8 Drawing Sheets

DELAY SPIKING NEURAL NETWORKS

CROSS REFERENCE TO RELATED APPLICATIONS

This application claims the benefit of the filing date of U.S. Provisional Patent Application No. 62/906,687, filed on Sep. 26, 2019, and U.S. Provisional Patent Application No. 63/044,975, filed on Jun. 26, 2020, the disclosures of which are incorporated by reference herein.

BACKGROUND OF THE INVENTION

The present invention relates generally to artificial neural networks, and more particularly to delay spiking neural networks.

Use of artificial intelligence (AI), particularly artificial neural networks, to provide solutions for various computational problems has blossomed. For example, deep learning neural networks have been demonstrated to be able to solve large data classification problems leveraging data-parallel processing hardware.

Unfortunately, the increasing ability of artificial neural networks to understand the real world has generally come at the expense of large amounts of CPU processing and power. Even though intense research is being conducted to reduce hardware complexity and power, neural networks today generally utilize multiplication to accumulate and combine data as it is received at the neurons, and multiplication is generally more costly in terms of integrated circuit power and area than many other operations. Particularly for embedded processors in mobile or other off-the-grid devices, excessive power consumption may provide a significant limitation on future use of neural networks. Furthermore, neural network execution generally needs to be performed in lock step since the output value of each neuron at each step uses the value of all the connected neurons at the preceding layer. Accounting for related timing and routing issues may be difficult.

BRIEF SUMMARY OF THE INVENTION

Traditional neural networks may be considered conceptually to communicate floating point values between neurons while Spiking Neural Networks (SNN) communicate with binary spikes with varying relative timing. Delay spiking neural networks may be considered to vary timing of propagation of spikes between neurons.

Some embodiments provide a delay spiking neural network (DSNN). In some embodiments the DSNN comprises a plurality of neurons arranged in at least two layers, with neurons of a preceding layer providing information to neurons of a subsequent layer, each neuron configured to receive a plurality of inputs, generate an indication of a delay for each of the plurality of inputs, effectively delay each of the plurality of inputs by their corresponding delay, and accumulate the effectively delayed plurality of inputs, with each neuron configured to generate an indication of an output signal in response to the accumulation of a predetermined number of delayed inputs.

In some embodiments each neuron includes circuitry to decrease accumulated effectively delayed plurality of inputs over time. In some embodiments the circuitry is configured to decrease accumulated effectively delayed inputs in accordance with an exponential function. In some embodiments each neuron is configured to generate the indication of the output signal in response to the accumulation of the predetermined number of delayed inputs only if the predetermined number of delayed inputs are accumulated within a predetermined period of time. In some embodiments each neuron does not include multiplication circuitry. In some embodiments the output signal of each neuron is a single binary value. In some embodiments outputs of neurons of a final layer comprise outputs of the DSNN. In some embodiments a first set of outputs of neurons of the final layer to change state comprises an output of the DSNN. In some embodiments the first set of outputs of neurons of the final layer consists of a single output.

In some embodiments the DSNN comprises a plurality of neurons arranged in at least two layers, with neurons of a preceding layer configured to provide information to neurons of a subsequent layer, each neuron configured to receive a plurality of inputs, each of which may indicate a spike from time-to-time, with each neuron including delay circuitry to delay indications of the spikes by periods programmable on a per input basis and integration circuitry to determine accumulation of spikes on a time decaying basis and comparison circuitry to determine if the accumulation of spikes on the time decaying basis exceeds a predetermined value, with, for neurons of the preceding layer, an output of the comparison circuitry being the information to be provided to neurons of the subsequent layer.

In some embodiments the output of the comparison circuitry is a single binary value. In some embodiments each neuron does not include multiplication circuitry. In some embodiments output of the comparison circuitry of neurons of a final layer comprise outputs of the DSNN. In some embodiments a first set of outputs of neurons of the final layer to change state comprises an output of the DSNN. In some embodiments the first set of outputs of neurons of the final layer consists of a single output.

In some embodiments different ones of the neurons are located in different racks of a network node. In some embodiments different ones of the neurons are located in different nodes of a network. In some embodiment different layers are located in different racks of a network node. In some embodiments different layers are located in different network nodes. In some embodiments different neurons of a single layer are located in different semiconductor integrated circuit chips. In some embodiments at least some of the different semiconductor integrated circuit chips are located in different nodes of a network. In some embodiment the different nodes of the network are coupled by the Internet.

In some embodiments the DSNN is implemented across large semiconductor dies. In some embodiments the DSNN is implemented across multiple semiconductor dies. In some embodiments the DSNN is implemented in across multiple nodes coupled by Ethernet connections. In some embodiments the DSNN is implemented in across multiple nodes coupled by the Internet.

In some embodiments the DSNN is in an embedded vision surveillance system. In some embodiments the DSNN is in a vision guided robotics system. In some embodiments the DSNN is in a non-linear adaptable control system. In some embodiments the DSNN is in a cyber security packet routing subsystem. In some embodiments DSNN is used for image classification and prediction in high-speed vehicle and/or robotics actuator control loops.

In some embodiments the DSNN is integrated in small AI-capable edge devices. In some embodiments DSNNs have distributed neurons across multiple devices, in some embodiments without incurring significant synchronization overhead.

In some embodiments DSNN is used as a coprocessor. In some embodiments, after writing delay values to DSNN memory, an ASIC incorporating the DSNN may output a prediction or classification of the DSNN in response to input values, in some embodiments without any CPU intervention or repeated store operations to external memory during the inference calculation, thus saving power in some embodiments.

In some embodiments a DSNN is trainable in the field. In some embodiments the training can be performed by a general-purpose CPU that hosts the DSNN as a peripheral device. The CPU may execute the training algorithm by writing the sensor inputs to the DSNN, on interrupt, compare the output value of the DSNN with labels, modify delay parameters, and reinitialize the DSSN memory. The computation of the new delay values is relatively fast with respect to the inference and therefore modifying and rewriting the training values could be entirely executed at interrupt time, in some embodiments.

Some embodiments provide a training algorithm for DSNN that reduces the need of analytical approximation of gradient descent using hardware to directly measure inference state variables. In some embodiments the algorithm uses supervised time-to-first-spike learning. Some embodiments use a hardware-software co-design that relies on storing voltage levels and timestamps obtained during an inference phase of each training sample in order to compute the new delays.

In some embodiments a DSNN includes neurons which determine output spikes based on accumulation over a period of time of delayed indications of received input spikes, with a delay associated with each received input spike. In some embodiments the delay associated with each received input spike is determined in an iterative manner through application of training patterns to the DSNN, the training patterns expected to generate a first spike by a particular neuron in an output layer, and backpropagating a positive error value for those neurons of the output layer other than the particular neuron and backpropagating a negative error value for the particular neuron, backpropagation of the positive error resulting in non-negative increases in the delays and backpropagation of the negative error value resulting in non-positive increases in the delays.

In some embodiments the error value backpropagated for a neuron of those neurons of the output layer other than the particular neuron is based on a time difference between a time of a spike by the neuron prior to the first spike and a time of the first spike, and the error value backpropagated for the particular neuron is based on a sum of time differences between times of spikes prior to the first spike by those neurons of the output layer other than the particular neuron and the time of the first spike. Some embodiments include storing indications of contributions of received input spikes in generating output spikes, and using the stored indications in modifying the delays.

These and other aspects of the invention are more fully comprehended upon review of this disclosure.

DETAILED DESCRIPTION

Figure 1:
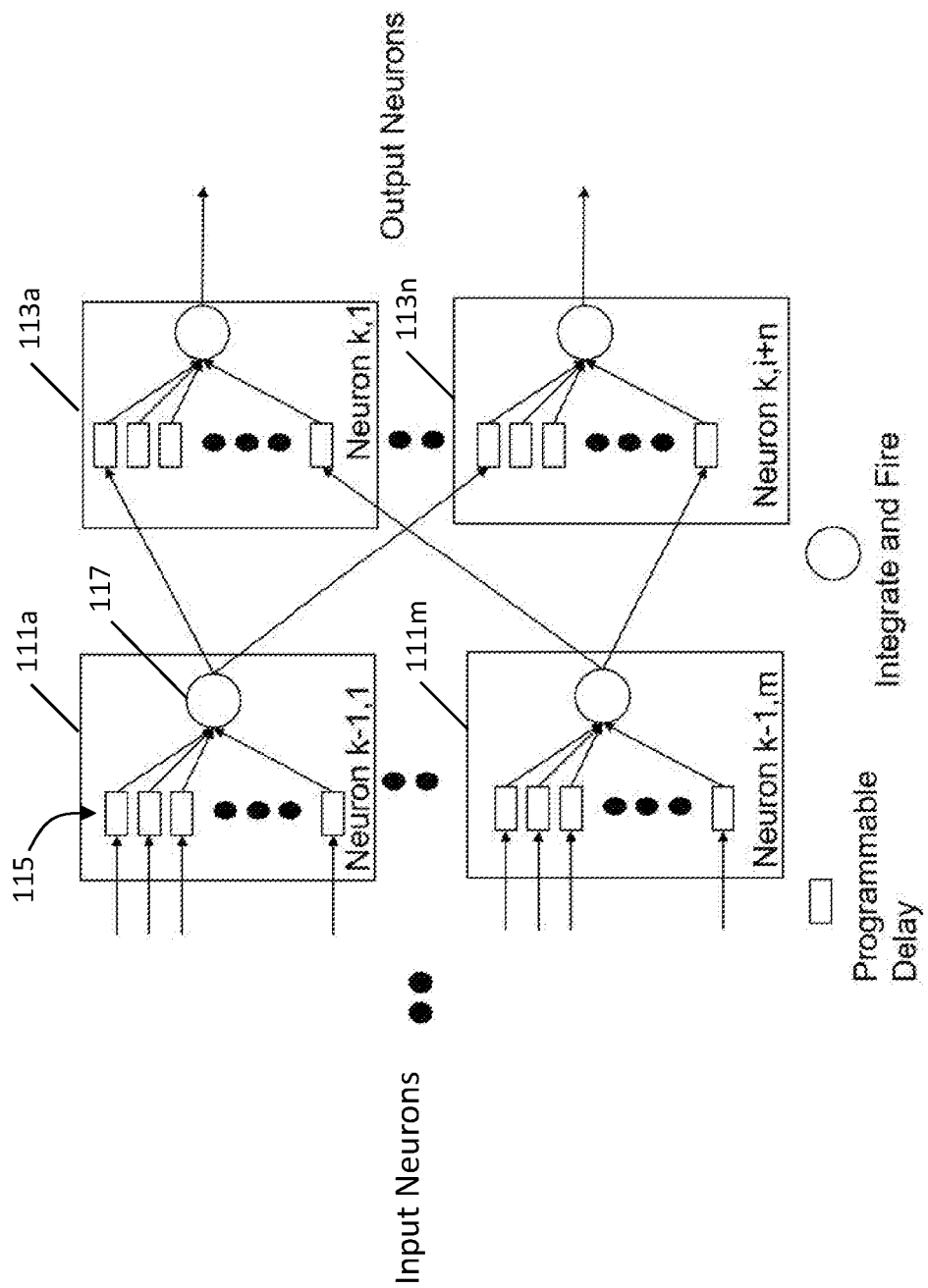
FIG. 1 shows an architecture of a fully connected delay spiking neural network (DSNN) in accordance with aspects of the invention.

FIG. 1 shows an architecture of a fully connected delay spiking neural network (DSNN) in accordance with aspects of the invention. The DSNN includes a plurality of neurons, with binary spikes communicated from one neuron to other neurons, generally with varying timing. Each neuron generates an output binary spike in response to receiving a sufficient number of input spikes in a sufficiently close order. The sufficiently close order may vary between neurons, and may vary between different input spikes for a single neuron. In some embodiments, a determination of whether a sufficient number of inputs spikes has been received in sufficiently close order may depend on delays, on a per input basis, between a time at which a spike is generated from a transmitting neuron and a time at which a receiving neuron considers the spike received for purposes of generating an output spike. In some embodiments the delays include general signal propagation delays between neurons and/or delays which the receiving neuron may apply to a received spike, with the delays applied on a per input basis. In most embodiments the neurons are formed of electronic circuit elements. In some embodiments the electronic circuit elements do not include multiplication circuits.

The neural network of FIG. 1 includes a plurality of neurons 111a-m and 113a-n. The neurons are arranged in layers, with for example neurons 111a-m being in a first layer and neurons 113a-n being in a second layer. The first layer receives inputs to the DSNN, and the second layer receives outputs of the first layer and provides outputs of the DSNN. The first layer may be considered a hidden layer, and the second layer may be considered a final layer or an output layer. In FIG. 1 two layers are explicitly illustrated, the first layer and the second layer. In general, there may be k layers of neurons, k being a number greater than 1. A first of the k layers may receive inputs to the DSNN and provide its outputs to a second of the k layers, the second of the k layers may provide its outputs to a third of the k layers, and so on until a kth layer receives inputs from a (k−1) layer, with the kth layer providing output(s) of the DSNN.

In FIG. 1, each neuron includes delay circuitry 115 and integration and fire circuitry 117. Inputs to the neurons are provided to the delay circuitry. In most embodiments the inputs to the neurons are binary values. The delay circuitry includes circuitry to delay each input received by the neuron. In most embodiments, the delay circuitry is configured to delay each input on a per input basis, with each input potentially being delayed for a different time period. In some embodiments, and as illustrated in FIG. 1, the delay circuitry includes separate delay elements for each input. In other embodiments the delay circuitry may be differently arranged. In most embodiments delays of the delay circuitry are determined as part of a learning phase applied to the DSNN. In some embodiments the learning phase may include application of one or more training patterns to the DSNN, comparison of output(s) of the DSNN with desired output(s) for the training patterns, and adjustment of the delays in a manner expected to decrease differences between the outputs of the DSNN and the desired outputs.

The integration and fire circuitry, in most embodiments, accumulates the delayed inputs and, in response to the accumulation of the delayed inputs exceeding a predetermined value, sets an output of the neuron to indicate such. In many embodiments the output of the neuron is a binary value, and may be considered a spike. In some embodiments the accumulation of the delayed inputs is over a predetermined period of time. In some embodiments the accumulation of the delayed inputs is over a sliding window of time, for example beginning at a predetermined time prior to a present time and ending at the present time. In some embodiments the accumulation of the delayed inputs is decayed over time. In some embodiments the accumulation of delayed inputs may be decreased by a predetermined amount, or a predetermined percentage, or according to a predetermined function over time. For example, in some embodiments the accumulation of delayed inputs is decayed according to an exponential function over time. Also for example, in some embodiments the accumulation of delayed inputs is set to 0.7 of the accumulation of delayed inputs on a predetermined periodic basis.

Figure 2:
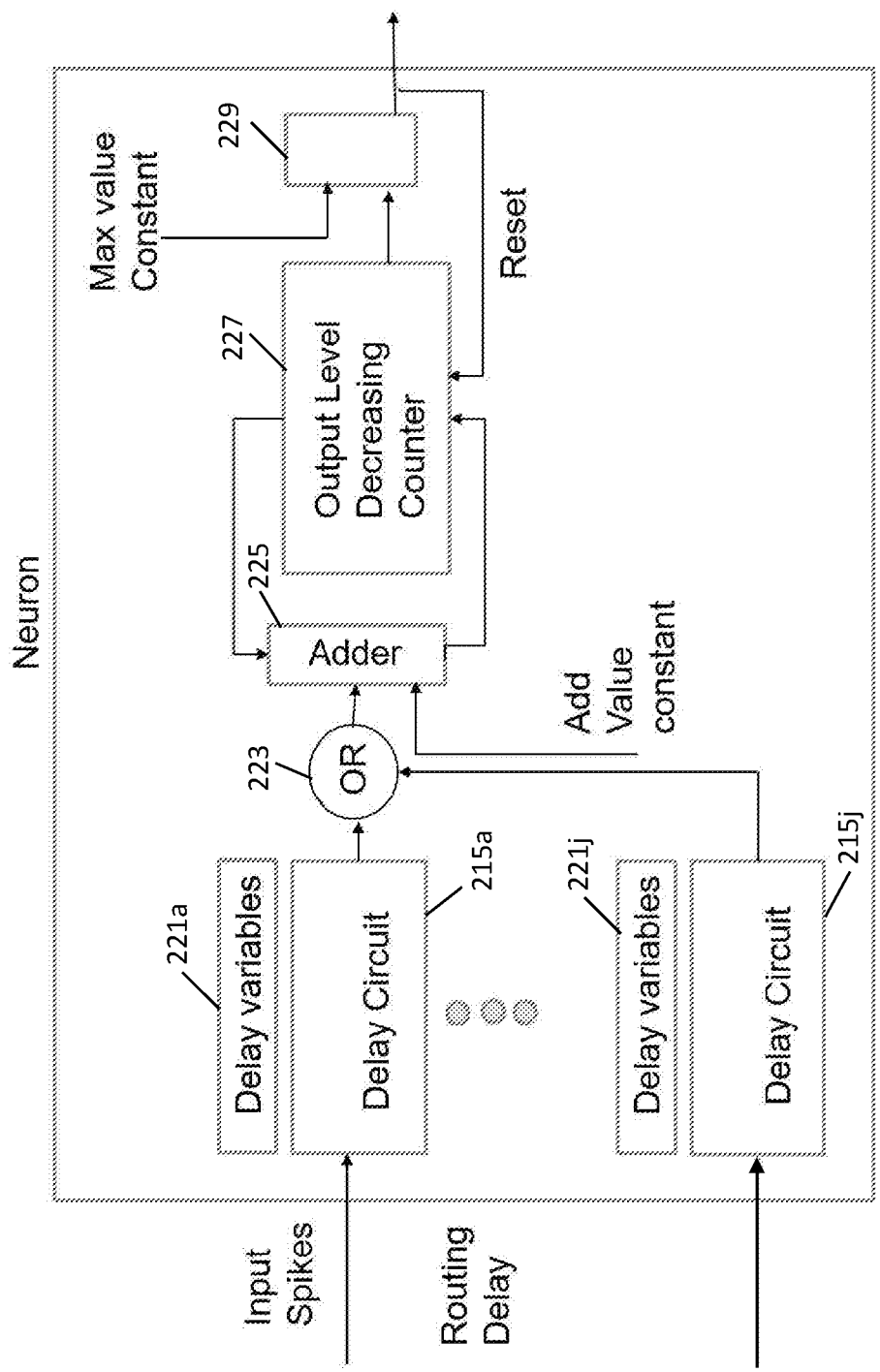
FIG. 2 is a block diagram of an example implementation of a neuron of a DSNN, in accordance with aspects of the invention.

FIG. 2 is a block diagram of an example implementation of a neuron of a DSNN, in accordance with aspects of the invention. The neuron is configured to receive a plurality of inputs, for example in the form of input spikes. The input spikes may be provided by other neurons, or may be inputs to the DSNN. The input spikes may be subject to routing delays en route to the neuron, and in some embodiments the routing delays to a neuron may not be the same for all neurons.

The neuron includes a plurality of delay circuits $215a\text{-}j$. Each of the plurality of inputs are provided to a different corresponding one of the delay circuits. Each delay circuit delays its input spike by a period of time determined by a delay variable $221a\text{-}j$ associated with each delay circuit. The delay variable may be determined, for example, during a training period for the DSNN.

The delayed input spikes are provided to an OR block 223. An adder 225 receives an output of the OR block. The adder also receives a value stored in a register 227 indicating a count or accumulation of delayed input spikes. An output of the adder is provided to the register 227 as a new value to store. In some embodiments the adder adds the output of the OR block with the value stored in the register, thereby incrementing the value stored in the register. The adder and register may be considered an accumulator or an integrator. In some embodiments the adder is also provided a constant value (or configured with a constant value) to add to value stored in the register, with the output of the OR block triggering operation of the adder. In some embodiments the neuron also includes circuitry to decrease the value stored in the register over time. In some embodiments the value stored in the register is decreased over time according to a predefined exponential function. In some embodiments the value stored in the register is decreased over time at a constant rate.

A comparator block 229 compares the value stored in the register with a predetermined constant value. In response to the value stored in the register being greater than the predetermined constant value, the comparator sets an output of the neuron to a predetermined binary value, generally a high value. The output of the neuron may be provided to other neurons, or may be an output of the DSNN. The output is also used by the neuron to reset the register 227, for example to indicate a zero count. With the register reset, the output of the comparator is also reset, and the output of the neuron may therefore be considered an output spike, being high for only a short time, for example a single clock cycle.

Figure 3:
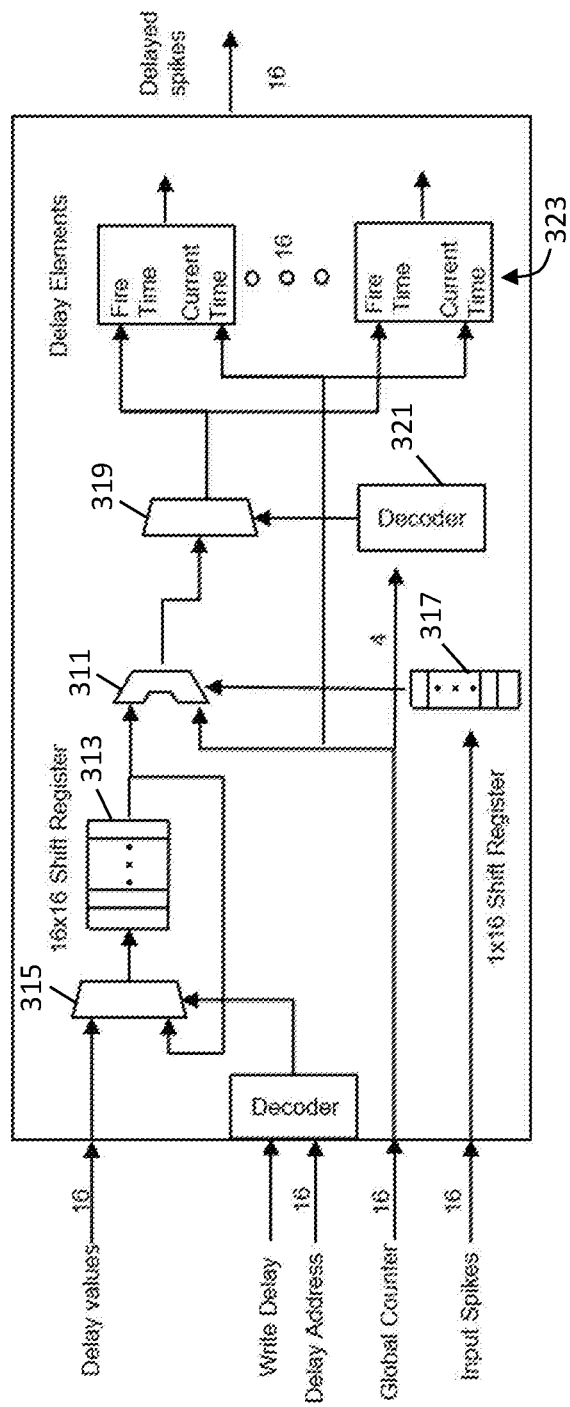
FIG. 3 is a block diagram of an example implementation of a delay element for a neuron of a DSNN, in accordance with aspects of the invention.

In some embodiments delay elements are implemented using programmable counters. For example, when an input spike (which may be a signal rising edge) is received, a programmable counter may use a 16-bit value, in some embodiments, determined during the neural network training, to delay the spike before it is delivered to a neuron integrator. In some embodiments the elements that limit the number of neurons that can fit in an FPGA are the programmable delay elements. Within each delay elements a 16-bit adder (used to calculate firing times) may also consume most of the logic resources. Accordingly, some embodiments organize delay elements in a group of 16. So organizing the delay elements may slow down output determinations of a neuron by a factor of 16, but may also reduce logic utilization by more than an order of magnitude FIG. 3 is a block diagram of an example implementation of a delay element for a neuron of a DSNN, in accordance with aspects of the invention. The implementation effectively organizes delay elements in a group of 16.

As shown in FIG. 3, the delay counters may be organized in groups of 16 that share a single 16-bit adder 311. Initial delays are stored in a 16×16 shift register 313. The shift register may be initialized, for example, using a demultiplexer 315 to either provide initial delay values, or during operation values from an output of the shift register, as an input to the shift register. After initialization the delay values cycle through every 16 clock cycles to expose, at the output of the shift register, one of the programmable delay values at each cycle.

Every 16 clock cycles, 16 input spikes are loaded into a 16×1 shift register 317. Synchronously with the delay values shift register 313, a value of the input spike (a 0 or a 1) is used to enable the shared adder 311. The adder adds the delay value provided by the shift register 313 with a global counter, which may for example indicate a current time. The output of the adder may therefore be considered a timestamp at which the corresponding input spike is to propagate to the integration circuit. A 4-bit decoder 321 selects, using the global counter, one out of 16 comparison elements 323 to store the new timestamp. In some embodiments the comparison elements may also be termed delay elements, as use of the comparison elements effectively result in output of a delayed version of an input spike. When the timestamp equals the global counter, the delay element outputs a spike. In some embodiments the comparison elements may also be termed delay elements, as use of the comparison elements effectively result in output of a delayed version of an input spike.

One significance of this circuit is that it allows varying the number of delay elements per adder thus providing a mechanism to vary the ratio of (1) logic dedicated to compute future timestamps and (2) storage requirement for the programmable delay values. A ratio of 16 seems to work well for the XILINX xcuvp9 FPGA but this number can be decreased or increased, in various embodiments.

Figure 4:
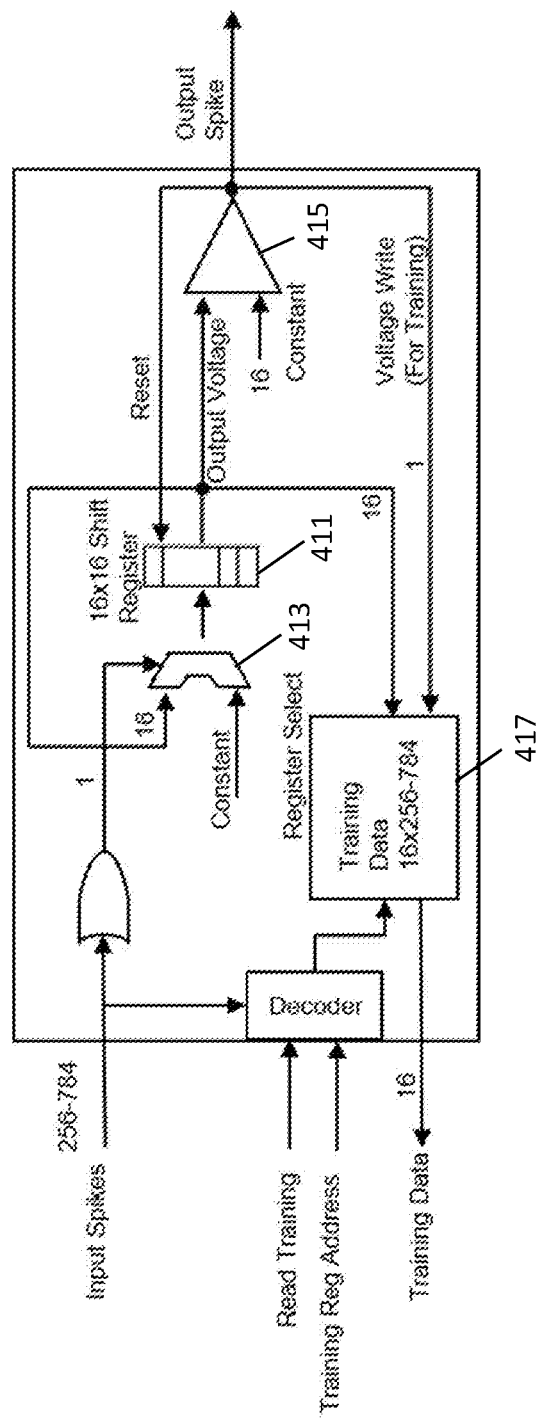
FIG. 4 is a block diagram of an example accumulator (or integrator) and output spike generator for a neuron of a DSNN, in accordance with aspects of the invention.

FIG. 4 is a block diagram of an example accumulator (or integrator) and output spike generator for a neuron of a DSNN, in accordance with aspects of the invention. In some embodiments the accumulator of FIG. 4 may be used in conjunction with the implementation of a delay element of FIG. 3.

In FIG. 4, as the integrator receives output spikes from the delay elements, the integrator adds a value to an output register 411. In some embodiments an adder 413 adds a constant value to a value stored in the output register if a spike is received. In some embodiments the value or values of the output register decay over time. In some embodiments the value(s) of the output register are indicative of an output voltage, or accumulated voltage. The values of the output register can be, for example provided to a digital-to-analog converter (DAC), to provide an analog voltage. If the value of the output register indicates a sufficient amount of voltage is accumulated, a comparator 415 generates an output spike of the neuron and the voltage indication of the register is reset to 0.

In some embodiments, when the comparator outputs a spike, pre-synaptic voltage indications (stored in the output register or a 16×16 shift register) and the time of the spike are recorded in registers 417 as training data for the synapsis that causes the spike. This indication of voltage may be used by a training algorithm to evaluate the contribution of each synapse to the firing. After the inference steps the training data may be read by the host CPU by addressing each individual register. In non-training mode the training data may be ignored.

Figure 5:
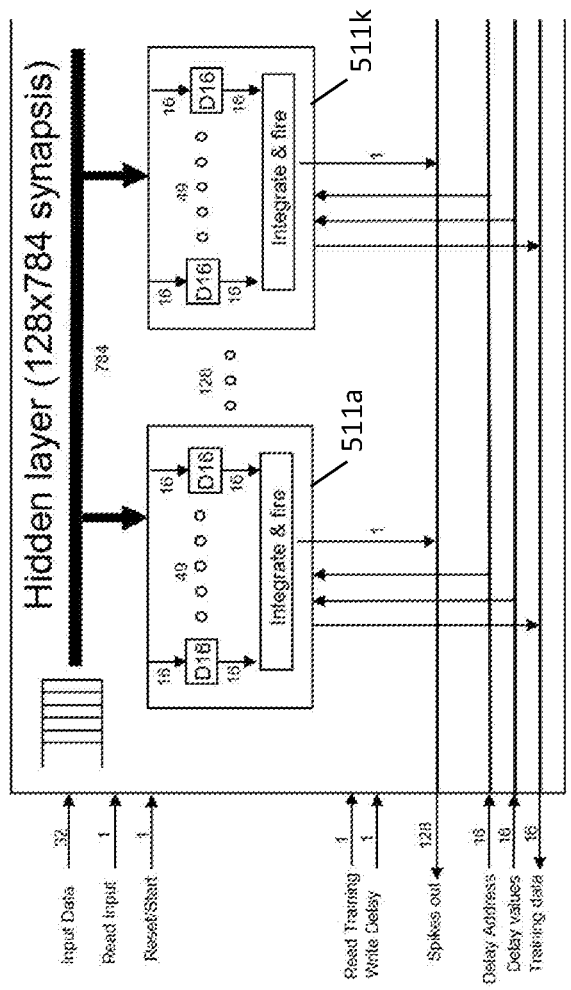
FIG. 5 is a semi-block diagram of a partial implementation of a hidden layer of a DSNN, in accordance with aspects of the invention.

FIG. 5 is a semi-block diagram of a partial implementation of a hidden layer of a DSNN, in accordance with aspects of the invention. In some embodiments the partial implementation of FIG. 5 is embodied in a single FPGA, with an identical parallel FPGA completing the implementation. The implementation of FIG. 5 receives 784 inputs. The inputs are fed to 128 neurons 511a-k. Each of the 128 neurons includes 49 groups of 16 synapsis. In some embodiments each of the 16 synapsis share a common adder, for example as discussed with respect to FIG. 3.

Figure 6:
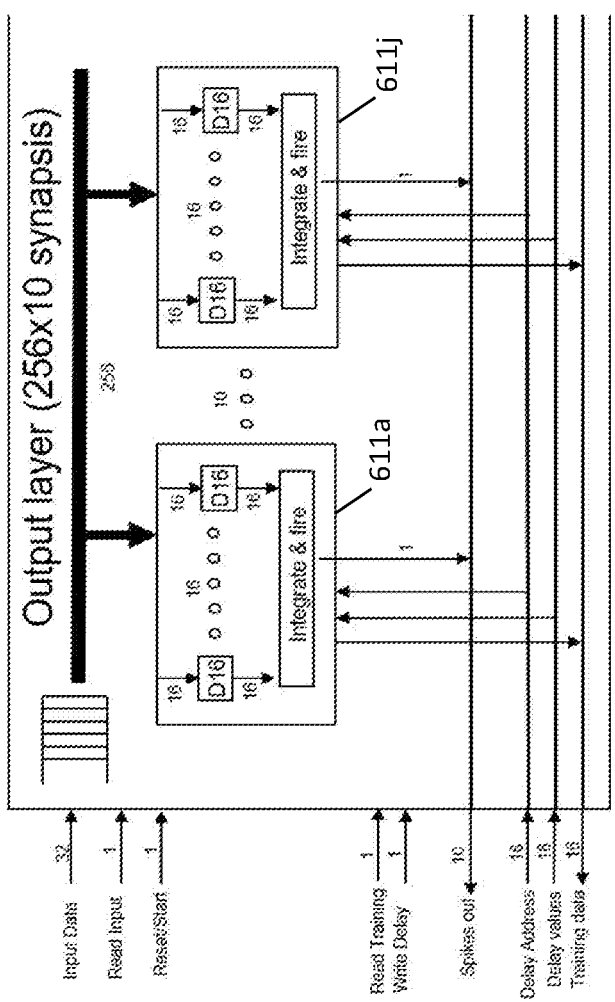
FIG. 6 is a semi-block diagram of an implementation of a hidden layer of a DSNN, in accordance with aspects of the invention.

FIG. 6 is a semi-block diagram of an implementation of an output layer of a DSNN, in accordance with aspects of the invention. In some embodiments the output layer is embodied in a single FPGA. The output layer receives spikes from the hidden layer and outputs the time-to-first-spike result using 10 neurons 611a-j. Again, the programmable delays are organized in groups of 16 that share the same adder. The 16 groups implement 256 synapsis that receive the input spikes from the hidden layer. 10 output neurons then present a spike indicating which digit was recognized. The first output neuron to spike indicates the output of the output layer. In some embodiments the 784 inputs represent pixels, for example of an image of a digit from 0 to 9, and the first output neuron to spike of the 10 output neurons represents the predicted digit.

Figure 7:
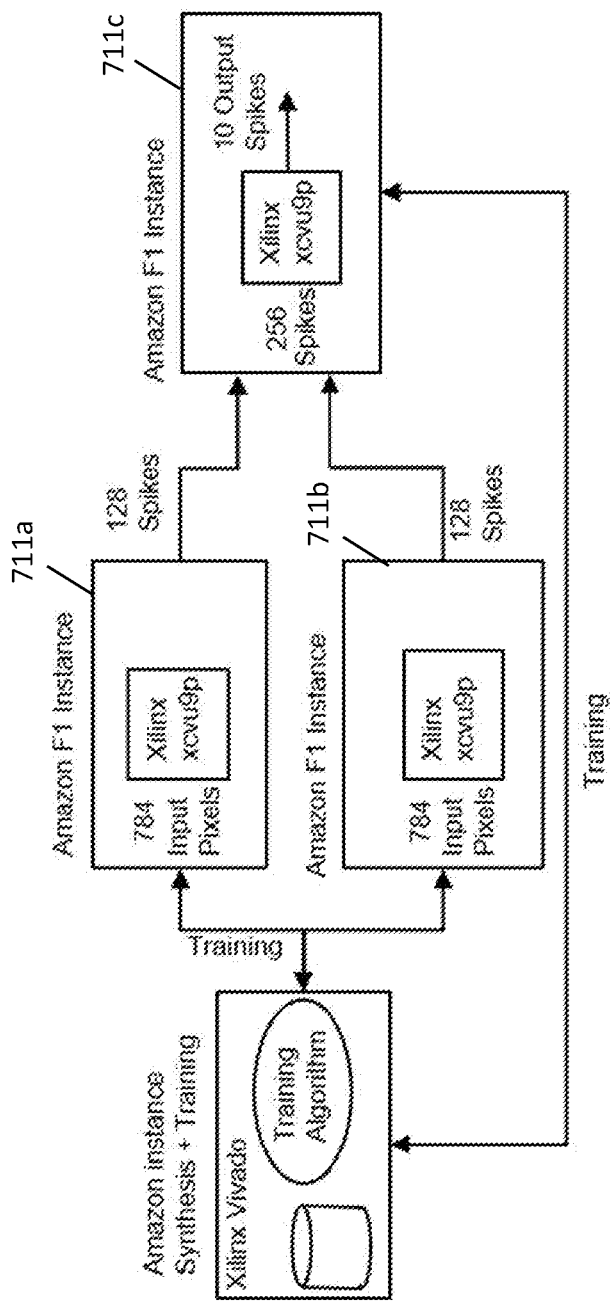
FIG. 7 is a block diagram of a distributed implementation of a DSNN, in accordance with aspects of the invention.

FIG. 7 is a block diagram of a distributed implementation of a DSNN, in accordance with aspects of the invention. In some embodiments a fully connected DSNN utilizes three FPGAs. In some embodiments the three FPGAs may be Amazon F1 instances, each with an FPGA. In some embodiments two of the FPGAs 711a,b implement a hidden layer, with the third FPGA 711c implementing an output layer. In some embodiments the FPGAs are distributed across different hardware nodes. In some embodiments the hardware nodes may be coupled by Ethernet connections. In some embodiments the hardware nodes may be coupled through the Internet. In some embodiments the hardware nodes may be in different rack, or in different shelves of a same rack. In some embodiments propagation delays between hardware nodes are absorbed during a training phase of the DSNN.

In some embodiments DSNNs in accordance with aspects of the invention determine delay values through use of a back propagation method. The back propagation method may be, for example, conducted as part of a training phase for the DSNN. In some embodiments, during the training phase, sets of inputs for which the DSNN should output known outputs are provided to the DSNN. In many embodiments a single set of inputs may be considered a training pattern, which it is hoped will induce the DSNN to provide a desired output. For example, in some embodiments the training patterns are inputs representing digits from 0 to 9, to which the DSNN should have a first spike from an output layer neuron indicating the input digit.

In some embodiments, once the desired output neuron D fires at time $t_d$, the time difference between any earlier firing of output neuron i $t_i$ is $$E_i = t_d - t_i.$$

While the total error is:

$$E_{tot} = \Sigma E_i$$

If the desired output neuron fires first, e.g. $E_{tot}$ equals zero, backpropagation for the training pattern may be skipped, in some embodiments. Otherwise, the desired output neuron D may be initialized to backpropagate $-E_{tot}$ while all the other output neurons are initialized to backpropagate $E_i$. The output neurons $N_{ki}$ now have their own Eh where k is the last layer.

In some embodiments, the following steps may be computed for each layer k in decreasing order and for each neuron i.

Each neuron $N_{k,i}$ sorts the values of $D_{k,i,j} + S_{(k-1),j}$ of each input.

Where:
k is the level of the neural network;
i is each neuron at level k;
j is one of the inputs to i from level k−1;
$D_{k,i,j}$ is the delay element from neuron $N_{(k-1),j}$ to $N_{k,i}$; and
$S_{k,t}$ is the time at which neuron $N_{k,i}$ first spikes.

In some embodiments, the nth smallest values of j inputs are then considered. For each of n inputs, a ratio value is computed as $$R_{k,i,j} = D_{k,i,j} / (D_{k,i,j} + S_{(k-1),j})$$

The delay element is updated to $D_{k,i,j} = D_{k,i,j} + R_{k,i,j} * E_{ki}$ and the quantity $(1 - R_{k,i,j}) * E_i$ is added to $E_{(k-1),j}$.

In some embodiments internal training values may be available from the DSNN during a training phase. In some such embodiments:

k is the level of the neural network, i is each neuron at level k and j is one of the inputs to i from level k−1;
$D_{k,i,j}$ is the delay element from neuron $N_{(k-1),j}$ to $N_{k,i}$;
$V_{k,i,j}$ is the total voltage contributed by synapse $N_{(k-1),j}$ to $N_{k,i}$;
$VTOT_{k,i} = \Sigma$ derivative of $V_{k,i,j}$ at the time of the spike for neuron k,i;
$t_d$ is the desired output neuron firing time;
$t_i$ is the firing time of output neuron i;
$E_i = t_d - t_i$ is the error for neuron i (if $t_d = t_i$ and i≠d then $E_i = 1$); and
$E_{tot} = \Sigma E_i$ is the total error of all the output neurons.

In some embodiments the following process may be performed:

If $E_{tot}=0$ the process may be skipped, otherwise, the output neurons other than the desired output neuron are initialized to backpropagate $E_t$, and the desired output neuron D is also initialized to backpropagate $-f*E_{tot}$ where f can be thought of as a learning rate ranging from 0 to 1. In some embodiments f is varied, in some embodiments in discrete increments, in some embodiments using an exponentially increasing values. The output neurons $N_{k,i}$ now have their own $E_{k,i}$ where k is the last layer.

The process propagates the timing errors from the output layer to the hidden layers as set forth below, in some embodiments according to how much voltage (or indication of voltage) a given synapsis contributes to the error. The error may also be split between the $k_{th}$ and $k-1_{th}$ layer using a ratio indicating where the delay is being observed.

In some embodiments the propagation may be performed by:

For each layer k starting from the output layer:

For each neuron $N_{k,i}$ where $VTOT_{k,i}$ is not equal to 0, calculate:

For each input j:

$$F_{k,i,j}=V_{k,i,j}/VTOT_{k,i};$$

$$R_{k,i,j}=VTOT_{k,i}/(VTOT_{k,i}+VTOT_{k-1,j});$$

Update the delay element to $D_{k,i,j}=D_{k,i,j}+F_{k,i,j}*E_{k,i}$; and Propagate the error to the preceding layer as $E_{(k-1),j}=E_{(k-1),j}+R_{k,i,j}*E_{k,i}$.

In some embodiments delay values for an implementation may be obtained through an offline learning process, and the delay parameters may be "hard coded" into subsequent synthesized or generated delay logic. In some embodiments this may further reduce susceptibility to single event effects, for example increasing radiation tolerance properties of the DSNN, and/or increase density of neurons per FPGA. Unlike other in-memory neural network processing designs, DSNN can therefore work in two distinct modes. A fully instantiated design can provide on-chip learning to discover the training parameters and then a trained instantiation can be very efficiently "hard-coded" into logic to further improve radiation tolerance, power efficiency and size.

Figure 8:
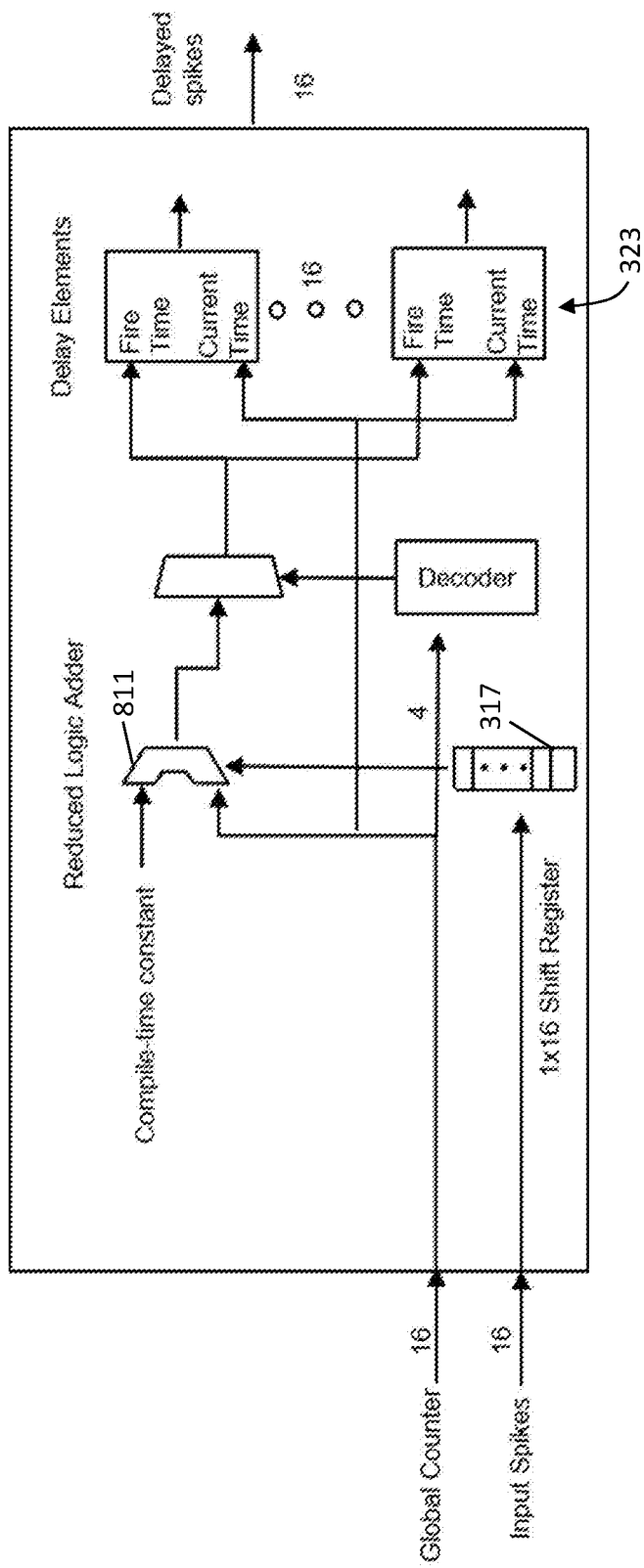
FIG. 8 is a block diagram of an example implementation of a delay element for a neuron of a DSNN, with the delay element incorporating hard-coded pre-learned delay times, in accordance with aspects of the invention.

FIG. 8 is a block diagram of an example implementation of a delay element for a neuron of a DSNN, with the delay element incorporating hard-coded pre-learned delay times, in accordance with aspects of the invention. As shown in FIG. 8 groups of synapses sharing the same quantized delay values may be grouped by 16 to share a same reduced-logic adder 811 using a time multiplexing scheme. This is similar to the implementation of FIG. 3. In the implementation FIG. 8, however, the 16×16 shift register is replaced with a constant. The spikes generated by the synapses would then be routed to the appropriate neurons.

In addition, some embodiments add quantization steps in the values of the delay elements. Grouping similar delay values into single values in some embodiments improve the density of the FPGA implementation because more synapses share the same reduced-logic adder obtained with a common, constant delay value. For example, in some embodiments delay values that are within 1 (step 1) are grouped into a single value. In some embodiments doing so reduces the amount of logic to compute delay timestamps, albeit at the possibility of some expense of some small degradation of the recognition rate.

Although the invention has been discussed with respect to various embodiments, it should be recognized that the invention comprises the novel and non-obvious claims supported by this disclosure.

What is claimed is:

1. A method of determining delays for a delay spiking neural network (DSNN), the DSNN including neurons which determine output spikes based on accumulation over a period of time of delayed indications of received input spikes, with a delay associated with each received input spike, the method comprising:
iteratively applying training patterns to the DSNN, each application of the training patterns expected to generate a first spike by a particular neuron in an output layer; and
for each training pattern, in response to a first spike by a neuron in the output layer other than the particular neuron, backpropagating a positive error value for those neurons of the output layer other than the particular neuron and backpropagating a negative error value for the particular neuron, backpropagation of the positive error value resulting in non-negative increases in the delays and backpropagation of the negative error value resulting in non-positive increases in the delays.

2. The method of claim 1, wherein the positive error value backpropagated for a neuron of those neurons of the output layer other than the particular neuron is based on a time difference between a time of a spike by the neuron prior to the first spike and a time of the first spike, and the negative error value backpropagated for the particular neuron is based on a sum of time differences between times of spikes prior to the first spike by those neurons of the output layer other than the particular neuron and the time of the first spike.

3. The method of claim 1, further comprising:
storing indications of contributions of received input spikes in generating output spikes; and
using the stored indications in modifying the delays.

4. The method of claim 1, wherein, for any training pattern, in response to a first spike by the particular neuron in the output layer expected to generate the first spike, ceasing iteratively applying training patterns to the DSNN.

* * * * *